United States Patent  
Choi

(10) Patent No.: US 9,518,620 B2  
(45) Date of Patent: Dec. 13, 2016

(54) DISCONNECTOR-TYPE CLUTCH FOR REAR WHEEL-DRIVING DEVICE IN FOUR-WHEEL DRIVING ELECTRIC VEHICLE

(71) Applicant: HYUNDAI WIA CORPORATION, Gyeongsangnam-Do (KR)

(72) Inventor: Hong Kyu Choi, Gyeonggi-Do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 0 days.

(21) Appl. No.: 14/252,738

(22) Filed: Apr. 14, 2014

(65) Prior Publication Data

US 2014/0305762 A1 Oct. 16, 2014

(30) Foreign Application Priority Data

Apr. 12, 2013 (KR) .......................... 10-2013-0040579

(51) Int. Cl.

| | |
|---|---|
| *F16D 23/12* | (2006.01) |
| *F16D 11/10* | (2006.01) |
| *F16D 28/00* | (2006.01) |
| *B60K 23/08* | (2006.01) |

(Continued)

(52) U.S. Cl.

CPC ............... *F16D 23/12* (2013.01); *B60K 23/08* (2013.01); *F16D 11/10* (2013.01); *F16D 28/00* (2013.01);

(Continued)

(58) Field of Classification Search

CPC ................ F16H 2061/2892; F16H 2063/3089; F16H 2061/2884

See application file for complete search history.

(56) References Cited

U.S. PATENT DOCUMENTS

| | | | |
|---|---|---|---|
| 4,425,814 A | * | 1/1984 | Dick ..................... F16H 63/304 |
| | | | 192/109 A |
| 2006/0223670 A1 | | 10/2006 | Nishikawa et al. |
| 2007/0034031 A1 | | 2/2007 | Swanson et al. |

FOREIGN PATENT DOCUMENTS

| | | |
|---|---|---|
| EP | 0545597 B1 | 1/1996 |
| EP | 0831250 A2 | 3/1998 |

(Continued)

OTHER PUBLICATIONS

European Search Report and European Search Opinion, May 8, 2014, 7 pages.

(Continued)

*Primary Examiner* — Mark Manley  
(74) *Attorney, Agent, or Firm* — Stetina Brunda Garred and Brucker

(57) ABSTRACT

Disclosed is a disconnector-type clutch for a rear wheel-driving device in a 4-wheel driving electric vehicle, which can eliminate a loss in the driving force due to a slip of friction plates disposed in a multiple disc clutch by transmitting power to rear wheels using the disconnector-type clutch, instead of the multiple disc clutch in 4-wheel driving, and can prevent a loss in the energy by preventing a differential from unnecessarily rotating when rear wheels are drawn by a driving force of front wheels in 2-wheel driving in which a rear-wheel driving motor is not driven by installing the disconnector-type clutch at a rear end of the differential. The disconnector-type clutch includes an actuator motor generating rotation power, a worm gear connected to the actuator motor, a screw rotating in engagement with the worm gear, a first push case converting a rotary motion of the screw into a linear reciprocating motion, a second push case assembled with the first push case, a first spring installed between the first push case and the second push case, a second spring installed at an exterior side of the (Continued)

second push case to provide a restoration force, a shifting fork connected to the second push case and moving forward and backward, and a sleeve connected to the shifting fork and connecting or disconnecting the first rear-wheel driving shaft and the second rear-wheel driving shaft.

10 Claims, 2 Drawing Sheets

(51) Int. Cl.
  *B60K 1/00* (2006.01)
  *F16D 11/00* (2006.01)
(52) U.S. Cl.
  CPC .. *B60K 2001/001* (2013.01); *B60K 2023/0858* (2013.01); *F16D 2011/002* (2013.01); *F16D 2023/123* (2013.01)

(56) References Cited

FOREIGN PATENT DOCUMENTS

| EP | 1449705 A2 | 8/2004 |
| FR | 2938938 A1 | 5/2010 |
| JP | 106021 | 9/1992 |
| JP | 201271750 | 4/2012 |
| KR | 1020050044825 | 5/2005 |

OTHER PUBLICATIONS

Korean Office Action of the Korean Application No. 10-2013-0040579, Feb. 28, 2014, pp. 1-3.

* cited by examiner

DISCONNECTOR-TYPE CLUTCH FOR REAR WHEEL-DRIVING DEVICE IN FOUR-WHEEL DRIVING ELECTRIC VEHICLE

CROSS-REFERENCE TO RELATED APPLICATION

This application claims priority to and the benefit of Korean Patent Application No. 10-2013-0040579, filed on Apr. 12, 2013, the entire content of which is incorporated herein by reference.

TECHNICAL FIELD

The present invention relates to a disconnector-type clutch for a rear wheel-driving device in a 4-wheel driving electric vehicle. More particularly, the present invention relates to a disconnector-type clutch for a rear wheel-driving device in a 4-wheel driving electric vehicle, which can eliminate a loss in the driving force due to a slip of friction plates disposed in a multiple disc clutch by transmitting power to rear wheels using a disconnector-type clutch, instead of the multiple disc clutch in 4-wheel driving, and can prevent a loss in the energy by preventing a differential from unnecessarily rotating when rear wheels are drawn by a driving force of front wheels in 2-wheel driving in which a rear-wheel driving motor is not driven by installing the disconnector-type clutch at a rear end of the differential.

BACKGROUND ART

Motor vehicles are generally driven in a 2-wheel drive mode and a 4-wheel drive mode.

First, the 2-wheel drive mode vehicle will be described. The 2-wheel drive mode vehicle is classified into a rear engine rear drive (RR) mode, a front engine front drive (FF) mode, a front engine rear drive (FR) mode, etc., in accordance with the position of the engine and whether the driving shaft is connected to the front wheels or rear wheels.

Since the RR mode is widely used in a sports car, rather than a passenger car or a SUV type vehicle, the 2-wheel drive mode vehicle may be largely classified into an FF mode vehicle and a FR mode vehicle.

Both of the FF and FR mode vehicles have the engine and the transmission installed at front sides of the vehicles while having different arrangement structures. That is to say, the FF mode vehicle is generally configured such that the engine and the transmission are laterally installed on the vehicle to transmit power to front wheels through a differential integrally formed with the transmission, and the FR mode vehicle is generally configured such that the engine and the transmission are installed on the vehicle back and forth to transmit power from the transmission to rear wheels through a propeller shaft.

Next, the 4-wheel drive mode vehicle will now be described. The 4-wheel drive mode vehicle employs a clutch, a transmission and a differential to appropriately exert a driving force of the engine on all four wheels and are classified into a part time mode for switching the drive mode from a 2-wheel drive mode to a 4-wheel drive mode by driver's manual operation and a full time mode (or a full time 4-wheel drive mode) for maintaining the drive mode all the time in a 4-wheel drive mode.

A 4-wheel drive vehicle basically travels in a 2-wheel drive mode and can be shifted manually by the driver operator from the 2-wheel drive mode to the 4-wheel drive mode when necessary. The FF mode part time 4-wheel drive vehicle is configured to supply power to front wheels in the 2-wheel drive mode and distributes the power to rear wheels in the 4-wheel drive mode. The FR mode part time 4-wheel drive vehicle is configured to supply power to rear wheels in the 2-wheel drive mode and distributes the power to front wheels in the 4-wheel drive mode.

As described above, unlike the 4-wheel driving vehicle using the engine as a power source, the 4-wheel driving electric vehicle uses motors as a power source. In the 4-wheel driving electric vehicle, a front-wheel driving motor and a rear-wheel driving motor are separately installed. The power generated from one of the front-wheel driving motor and the rear-wheel driving motor is used in the 2-wheel drive mode, and both of the power generated from the front-wheel driving motor and the power generated from the rear-wheel driving motor are used in the 4-wheel drive mode.

FIG. 1 is a cross-sectional view of a conventional rear-wheel driving device for a 4-wheel driving electric vehicle.

As shown in FIG. 1, the conventional rear-wheel driving device for a 4-wheel driving electric vehicle includes a rear-wheel driving motor 10 generating rotation power for driving the vehicle, a reducer 20 connected to a rotary shaft of the rear-wheel driving motor 10, a multiple disc clutch 30 connected to the reducer 20, a differential 40 connected to the multiple disc clutch 30, and a rear wheel driving shaft 50 connected to the differential 40 and having left and right ends to mount rear wheels (not shown) thereon.

The aforementioned conventional rear-wheel driving device for a 4-wheel driving electric vehicle operates in the following manner.

If rotation power is generated from the rear-wheel driving motor 10 in 4-wheel driving, after receiving the rotation power of the rear-wheel driving motor 10, the reducer 20 transmits the rotation power to the multiple disc clutch 30.

The multiple disc clutch 30 transmits the rotation power transmitted from the reducer 20 to a case of the differential 40, thereby rotating the rear wheel driving shaft 50 connected to the differential 40.

The rear wheels (not shown) are mounted on opposite ends of the rear wheel driving shaft 50 to perform a differential function and to transmit the driving force to the rear wheels, thereby driving the vehicle.

In 2-wheel driving, the rear-wheel driving motor 10 does not generate the rotation power, and the multiple disc clutch 30 does not transmit the rotation power to the case of the differential 40, so that the rear wheels are not drawn by the driving force of the front wheels.

However, in the conventional rear-wheel driving device for a 4-wheel driving electric vehicle, since the power is transmitted using a multiple disc clutch in 4-wheel driving, a loss in the driving force may be generated due to a slip between friction plates disposed within the multiple disc clutch.

In addition, in the conventional rear-wheel driving device for a 4-wheel driving electric vehicle, in 2-wheel driving in which a rear-wheel driving motor is not driven, a portion of the multiple disc clutch connected to the case of the differential 40 may unnecessarily rotate together with the differential when the rear wheels are drawn by the driving force of the front wheels, resulting in energy loss.

DISCLOSURE OF THE INVENTION

In order to overcome the above-mentioned shortcomings, the present invention provides a disconnector-type clutch for a rear wheel-driving device in a 4-wheel driving electric vehicle, which can eliminate a loss in the driving force due to a slip of friction plates disposed in a multiple disc clutch by transmitting power to rear wheels using a disconnector-type clutch, instead of the multiple disc clutch in 4-wheel driving.

In addition, the present invention also provides a disconnector-type clutch for a rear wheel-driving device in a 4-wheel driving electric vehicle, which can prevent a loss in the energy by preventing a differential from unnecessarily rotating when rear wheels are drawn by a driving force of front wheels in 2-wheel driving in which a rear-wheel driving motor is not driven by installing the disconnector-type clutch at a rear end of the differential.

According to an aspect of the invention, there is provided a disconnector-type clutch for a rear wheel-driving device in a 4-wheel driving electric vehicle, the disconnector-type clutch including an actuator motor generating rotation power; a worm gear connected to the actuator motor; a screw rotating in engagement with the worm gear; a first push case converting a rotary motion of the screw into a linear reciprocating motion; a second push case assembled with the first push case; a first spring installed between the first push case and the second push case; a second spring installed at an exterior side of the second push case to provide a restoration force; a shifting fork connected to the second push case and moving forward and backward; and a sleeve connected to the shifting fork and connecting or disconnecting the first rear-wheel driving shaft and the second rear-wheel driving shaft.

The first rear-wheel driving shaft may be installed to penetrate the inside of the rear-wheel driving motor.

The screw may have a centrally formed gear engaged with the worm gear and a screw thread may be formed in both front and rear directions.

A nut may be installed at one side of the screw, and first and second sensors for sensing forward and rearward motions of the first push case may be installed using the nut.

The first push case may have outer and inner case portions and a screw thread to be engaged with the screw may be formed on an inner circumferential surface of the inner case portion.

A sleeve may be installed at an interior side of the shifting fork to be spline-coupled to the first rear-wheel driving shaft and the second rear-wheel driving shaft to connect or disconnect the first rear-wheel driving shaft and the second rear-wheel driving shaft.

In 4-wheel driving, the sleeve may connect the first rear-wheel driving shaft and the second rear-wheel driving shaft to be engaged with each other to transmit the rotation power of the first rear-wheel driving shaft to the second rear-wheel driving shaft.

In 2-wheel driving, the sleeve may move so as to disconnect the first rear-wheel driving shaft and the second rear-wheel driving shaft from each other to prevent the rotation power of the first rear-wheel driving shaft from being transmitted to the second rear-wheel driving shaft.

ADVANTAGEOUS EFFECTS

As described above, in the disconnector-type clutch for a rear wheel-driving device in a 4-wheel driving electric vehicle according to the present invention, a loss in the driving force due to a slip of friction plates disposed in a multiple disc clutch can be eliminated by transmitting power to rear wheels using a disconnector-type clutch, instead of the multiple disc clutch in 4-wheel driving.

In addition, in the disconnector-type clutch for a rear wheel-driving device in a 4-wheel driving electric vehicle according to the present invention, a loss in the energy can be prevented by preventing a differential from unnecessarily rotating when rear wheels are drawn by a driving force of front wheels in 2-wheel driving in which a rear-wheel driving motor is not driven by installing the disconnector-type clutch at a rear end of the differential.

BRIEF DESCRIPTION OF THE DRAWINGS

The objects, features and advantages of the present invention will be more apparent from the following detailed description in conjunction with the accompanying drawings, in which.

BEST MODE FOR CARRYING OUT THE INVENTION

Figure 1:
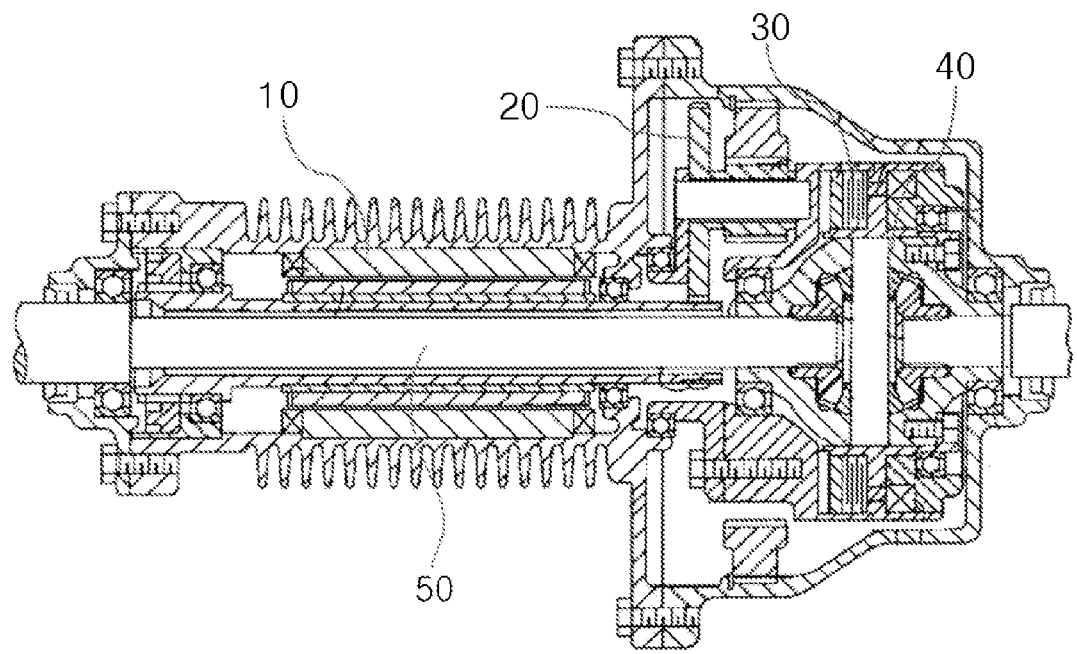
FIG. 1 is a cross-sectional view of a conventional rear-wheel driving device for a 4-wheel driving electric vehicle.

Hereinafter, an exemplary embodiment of the invention will be described in detail with reference to the accompanying drawings such that they can easily be made and used by those skilled in the art. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In addition, all terms or words used herein are defined based on the principle that the inventor can appropriately define concepts of the terms for describing his/her invention in the best way and those terms will not be interpreted only in commonly used dictionaries, should be interpreted as having a meaning that is consistent with their meaning in the context of the relevant art and the present disclosure. For example, for the sake of convenient explanation, terms regarding orientations may be set on the basis of positions expressed in the drawings.

Figure 2:
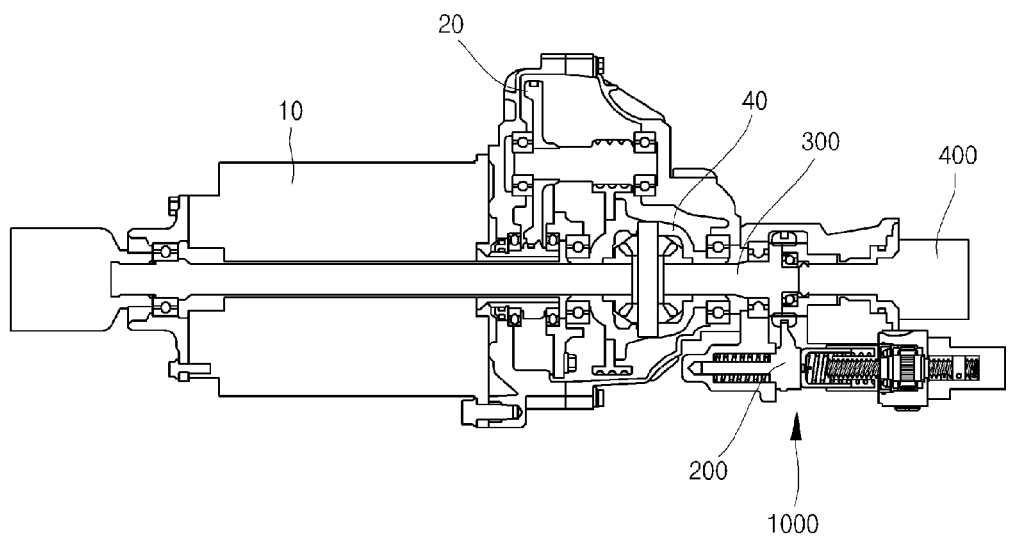
FIG. 2 is a cross-sectional view of a disconnector-type clutch of a rear-wheel driving device for a 4-wheel driving electric vehicle according to an embodiment of the present invention.

FIG. 2 is a cross-sectional view of a disconnector-type clutch of a rear-wheel driving device for a 4-wheel driving electric vehicle according to an embodiment of the present invention.

As shown in FIG. 2, the rear-wheel driving device having the disconnector-type clutch for a rear wheel-driving device in a 4-wheel driving electric vehicle according to an embodiment of the present invention includes a rear-wheel driving motor 10 generating rotation power for driving the vehicle, a reducer 20 receiving the power from the rear-wheel driving motor 10, a differential 40 connected to the reducer 20, a first rear-wheel driving shaft 300 connected to the differential 40 and having one end to mount a rear wheel (not shown)

thereon, a second rear-wheel driving shaft 400 installed to face the first rear-wheel driving shaft 300 on the same line and having one end to mount another rear wheel (not shown) thereon, and a disconnector-type clutch 1000 connecting or disconnecting the first rear-wheel driving shaft 300 and the second rear-wheel driving shaft 400. The first rear-wheel driving shaft 300 is installed to penetrate the inside of the rear-wheel driving motor 10.

Figure 3:
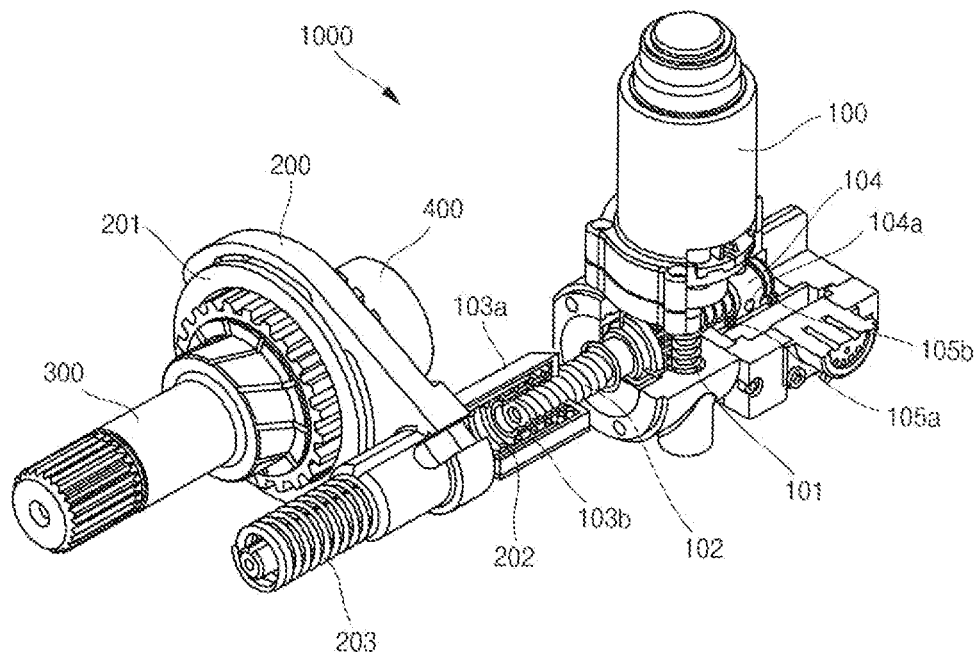
FIG. 3 is a perspective view of the disconnector-type clutch shown in FIG. 2.
Figure 4:
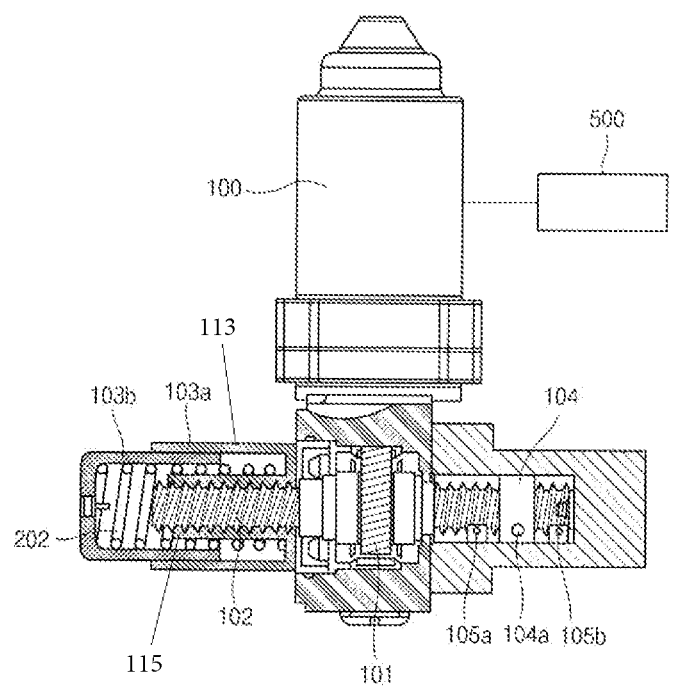
FIG. 4 is a partially cross-sectional view of the disconnector-type clutch shown in FIG. 2.

FIG. 3 is a perspective view of the disconnector-type clutch of a rear-wheel driving device for a 4-wheel driving electric vehicle according to an embodiment of the present invention, and FIG. 4 is a partially cross-sectional view of the disconnector-type clutch of a rear-wheel driving device for a 4-wheel driving electric vehicle according to an embodiment of the present invention.

As shown in FIGS. 3 and 4, the disconnector-type clutch 1000 of a rear-wheel driving device for a 4-wheel driving electric vehicle according to an embodiment of the present invention includes an actuator motor 100 generating rotation power, a worm gear 101 connected to the actuator motor 100, a screw 102 rotating in engagement with the worm gear 101, a first push case 103a converting a rotary motion of the screw 102 into a linear reciprocating motion, a second push case 103b assembled with the first push case 103a, a first spring 202 installed between the first push case 103a and the second push case 103b, a second spring 203 installed at an exterior side of the second push case 103b to provide a restoration force, a shifting fork 200 connected to the second push case 103b and moving forward and backward, and a sleeve 201 connected to the shifting fork 200 and connecting or disconnecting the first rear-wheel driving shaft 300 and the second rear-wheel driving shaft 400.

The screw 102 has a centrally formed gear engaged with the worm gear 101 and a screw thread is formed in both front and rear directions.

A nut 104 is installed at one side of the screw 102, and first and second sensors 105a and 105b for sensing forward and rearward motions of the first push case 103a using the nut 104.

The first push case 103a has outer and inner case portions 113, 115, where the inner case portion 115 is inside the outer case portion 113 and fixed thereto, and a screw thread to be engaged with the screw 102 is formed on an inner circumferential surface of the inner case portion 115.

A sleeve 201 is installed at an interior side of the shifting fork 200 to be spline-coupled to the first rear-wheel driving shaft 300 and the second rear-wheel driving shaft 400 to connect or disconnect the first rear-wheel driving shaft 300 and the second rear-wheel driving shaft 400.

The second spring 203 is installed at an exterior side of the second push case 103b to absorb shocks applied from the sleeve 201 and the shifting fork 200 and to provide a elastic force for eliminating the engaged state.

The aforementioned disconnector-type clutch of a rear-wheel driving device for a 4-wheel driving electric vehicle according to an embodiment of the present invention operates in the following manner.

If rotation power is generated from the rear-wheel driving motor 10 in 4-wheel driving, after receiving the rotation power of the rear-wheel driving motor 10, the reducer 20 transmits the rotation power to the differential 40, thereby rotating the first rear-wheel driving shaft 300 connected to the differential 40.

In 4-wheel driving, the disconnector-type clutch 1000 connects the first rear-wheel driving shaft 300 and the second rear-wheel driving shaft 400 to each other, thereby transmitting the power from the first rear-wheel driving shaft 300 to the second rear-wheel driving shaft 400. The first rear-wheel driving shaft 300 and the second rear-wheel driving shaft 400 Rear wheels (not shown) are mounted on the first rear-wheel driving shaft 300 and the second rear-wheel driving shaft 400 to perform a differential function and to transmit the driving force to the rear wheels, thereby driving the vehicle.

In 4-wheel driving, the disconnector-type clutch 1000 operates in the following manner.

If rotation power is generated from the actuator motor 100 in a forward direction, the worm gear 101 connected to the actuator motor 100 rotates the screw 102 geared therewith in the forward direction.

If the screw 102 is rotated in the forward direction, the first push case 103a connected to one side of the screw 102 moves forward, the nut 104 connected to the other side of the screw 102 moves by a distance in which the first sensor 105a is positioned, and the controller 500 senses that the first push case 103a has moved forward.

If the first push case 103a moves forward, the first spring 202 pushes the second push case 103b forward, thereby pushing the shifting fork 200 connected to the second push case 103b forward.

As described above, the shifting fork 200 connected to the second push case 103b and having moved forward pushes the sleeve 201 connected to the second rear-wheel driving shaft 400 to the first rear-wheel driving shaft 300, thereby allowing the sleeve 201 to connect the first rear-wheel driving shaft 300 and the second rear-wheel driving shaft 400 to be engaged with each other, thereby transmitting the rotation power of the first rear-wheel driving shaft 300 to the second rear-wheel driving shaft 400.

In 2-wheel driving, if rotation power is generated from the actuator motor 100 in a backward direction, the worm gear 101 connected to the actuator motor 100 rotates the screw 102 geared therewith in the backward direction.

If the screw 102 is rotated in the backward direction, the first push case 103a connected to one side of the screw 102 moves backward, the nut 104 connected to the other side of the screw 102 moves by a distance in which the first sensor 105a is positioned, and the controller 500 senses that the first push case 103a has moved backward.

If the first push case 103a moves backward, the first spring 202 pushes the second push case 103b backward, thereby pushing the shifting fork 200 connected to the second push case 103b backward.

As described above, the shifting fork 200 connected to the second push case 103b and having moved backward pushes the sleeve 201 connected to the first rear-wheel driving shaft 300 and the second rear-wheel driving shaft 400 to the second rear-wheel driving shaft 400, thereby allowing the sleeve 201 to disconnect the first rear-wheel driving shaft 300 and the second rear-wheel driving shaft 400 to be disengaged from each other, thereby preventing the rotation power of the first rear-wheel driving shaft 300 from being transmitted to the second rear-wheel driving shaft 400.

In 2-wheel driving in which the rear-wheel driving motor 10 does not operate, as the first rear-wheel driving shaft 300 and the second rear-wheel driving shaft 300 are separated from each other, a loss in the energy can be prevented by preventing the case of the differential 40 from unnecessarily rotating when rear wheels are drawn by the driving force of front wheels.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A disconnector-type clutch for a rear wheel-driving device in a 4-wheel driving electric vehicle, the disconnector-type clutch comprising:
   an actuator motor generating rotation power;
   a worm gear connected to the actuator motor; a screw rotating in engagement with the worm gear;
   a first push case converting a rotary motion of the screw into a linear reciprocating motion;
   a second push case assembled with the first push case, the first push case and the second push case collectively defining a cavity;
   a first spring installed between the first push case and the second push case and located within the cavity;
   a second spring installed at an exterior side of the second push case to provide a restoration force;
   a shifting fork connected to the second push case and moving forward and backward; and
   a sleeve connected to the shifting fork and connecting or disconnecting a first rear-wheel driving shaft and a second rear-wheel driving shaft;
   wherein the first push case has outer and inner case portions and a screw thread to be engaged with the screw is formed on an inner circumferential surface of the inner case portion, at least a portion of the second push case being received between the outer and inner case portions.

2. The disconnector-type clutch of claim 1, wherein the first rear-wheel driving shaft is installed to penetrate an inside of a rear-wheel driving motor.

3. The disconnector-type clutch of claim 1, wherein the screw has a centrally formed gear engaged with the worm gear and a screw thread is formed in both front and rear directions.

4. The disconnector-type clutch of claim 1, wherein a nut is installed at one side of the screw, and first and second sensors for sensing forward and rearward motions of the first push case are installed using the nut.

5. The disconnector-type clutch of claim 1, wherein a sleeve is installed at an interior side of the shifting fork to be spline-coupled to the first rear-wheel driving shaft and the second rear-wheel driving shaft to connect or disconnect the first rear-wheel driving shaft and the second rear-wheel driving shaft.

6. The disconnector-type clutch of claim 1, wherein in 4-wheel driving, the sleeve connects the first rear-wheel driving shaft and the second rear-wheel driving shaft to be engaged with each other to transmit the rotation power of the first rear-wheel driving shaft to the second rear-wheel driving shaft.

7. The disconnector-type clutch of claim 1, wherein in 2-wheel driving, the sleeve moves so as to disconnect the first rear-wheel driving shaft and the second rear-wheel driving shaft from each other to prevent the rotation power of the first rear-wheel driving shaft from being transmitted to the second rear-wheel driving shaft.

8. The disconnector-type clutch of claim 1, wherein the first rear-wheel driving shaft and the second rear-wheel driving shaft are selectively connected via an inner circumferential surface of the sleeve.

9. The disconnector-type clutch of claim 1, wherein the second push case overlaps a portion of the first push case.

10. The disconnector type clutch of claim 1, wherein the a portion of the second push case is received within the first push case.

* * * * *